Jan. 6, 1970  E. M. DAVIDSON  3,487,519
METHOD OF MAKING AXIAL FLOW FANS
Filed Aug. 31, 1967  2 Sheets-Sheet 1
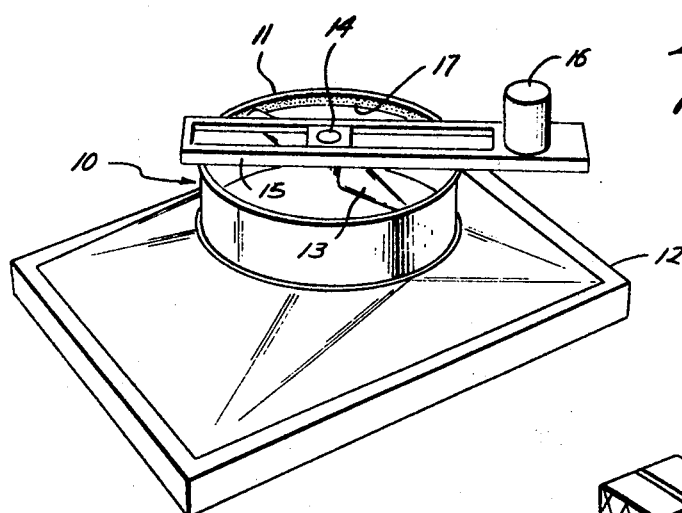
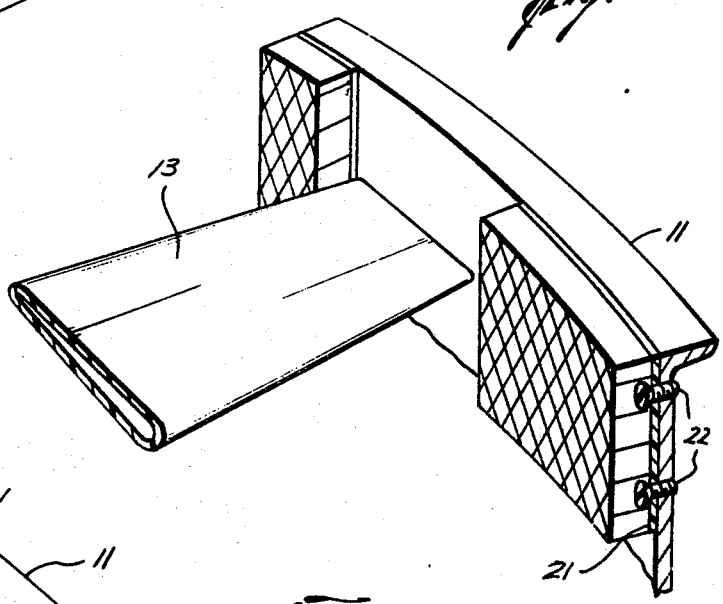
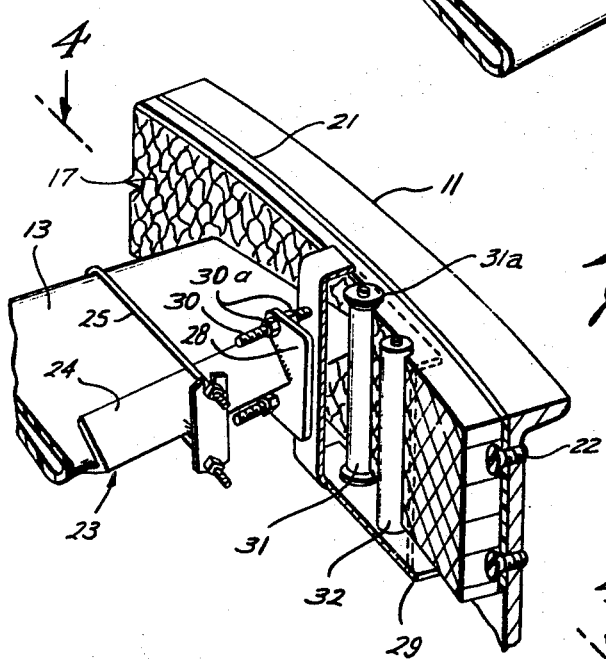
Eugene M. Davidson
INVENTOR.
BY
ATTORNEYS

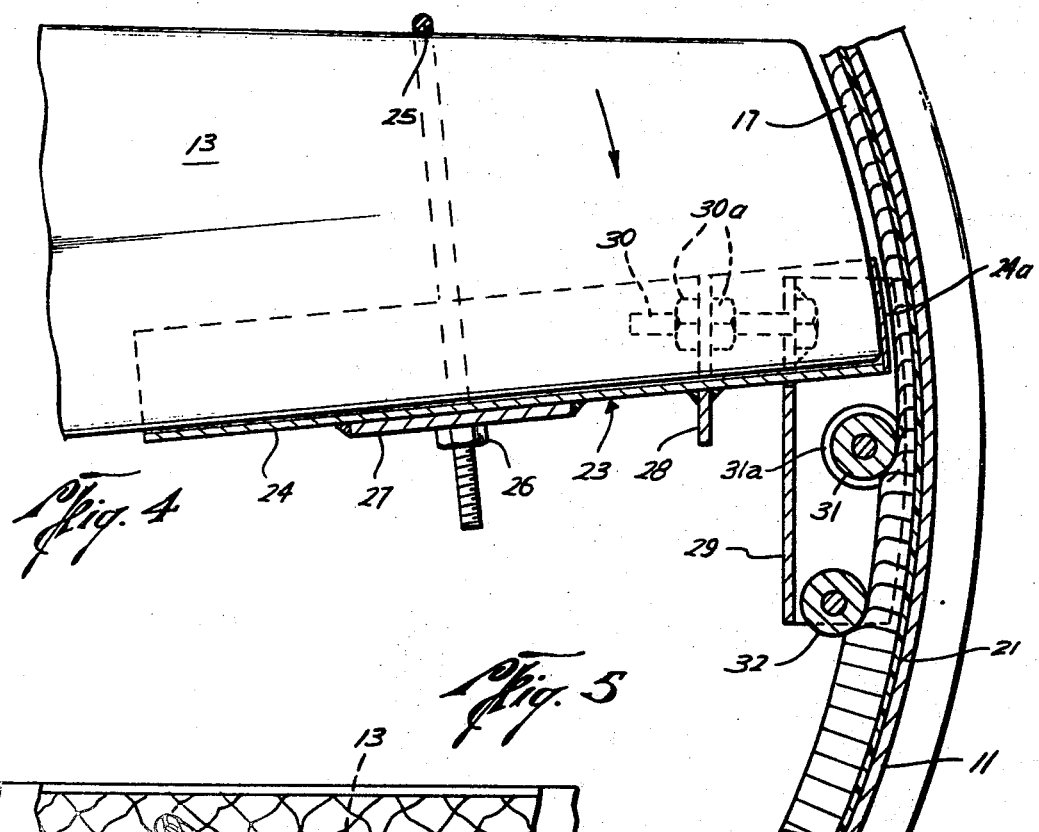
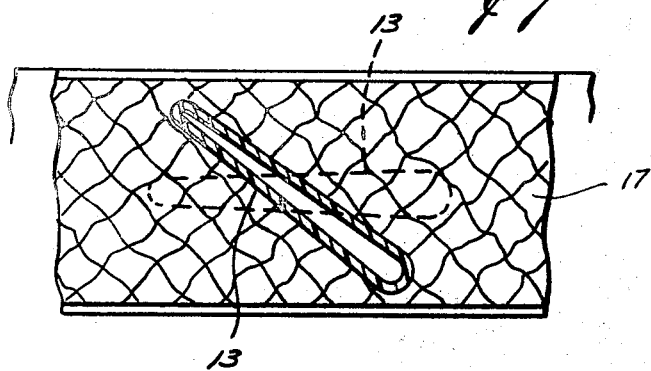
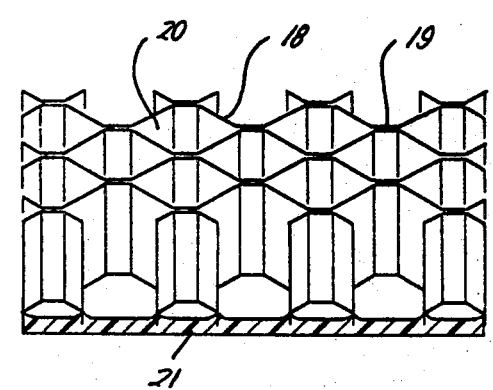
Eugene M. Davidson
INVENTOR.

United States Patent Office 3,487,519
Patented Jan. 6, 1970

3,487,519
METHOD OF MAKING AXIAL FLOW FANS
Eugene M. Davidson, Houston, Tex., assignor to Hudson Engineering Corporation, Houston, Tex.
Filed Aug. 31, 1967, Ser. No. 664,819
Int. Cl. B21d *39/00;* B21k *3/04;* B23p *15/04*
U.S. Cl. 29—156.8                     2 Claims

ABSTRACT OF THE DISCLOSURE

In a method of making an axial flow fan comprising a rolled fan ring, a blade rotatably mounted within the fan ring, and a lining of metal foil honeycomb about the inner periphery of the ring with the openings therethrough extending radially of the ring. At least a portion of the inner surface of the lining is crushed to provide a substantially uniform clearance about the tip of the blade. The honeycomb is constructed of sheets of the metal foil which are bent and joined together at spaced apart locations by an adhesive. A layer of the honeycomb is first annealed and then installed in the ring. Annealing renders the honeycomb soft and substantially destroys the bond so that the lining may be crushed to only a fraction of its original thickness.

---

This invention relates to improvements in large axial flow fans adapted for industrial use.

In fans of this type, wherein the fan blades may measure 6 feet or more from tip-to-tip, the ring in which the blades rotate is rolled and usually requires welding and galvanizing. As a result, the ring is out-of-round to a considerable extent, so that the actual clearance between the blade tip and the ring may be a good deal less in some spots and a good deal more in other spots than the nominal clearance therebetween. Since the minimum clearance obviously controls the tip-to-tip size of the blades, there are large clearances between the tip and portions of the ring, which result in a fairly substantial loss of efficiency.

It has heretofore been proposed to prevent leakage past the tips of rotor blades of turbines or the like by means of a seal comprising a layer of metal foil honeycomb lining the stator with the openings through the honeycomb extending radially of the stator. Commercially available honeycomb of this type comprises sheets of metal foil which are bent along their lengths and joined at spaced apart locations by means of an adhesive. It has further been proposed to accomplish theoretically zero clearance between such rotors and stators by using a layer somewhat thicker than the distance between the rotor tip and stator and then comprising the inner periphery of the honeycomb layer by one or more turns of the rotor.

These prior practices in the turbine and related arts provided no answer to the problems above-noted with respect to the large blade tip-to-ring tolerances in axial flow fans, because of their incompatibility with the compressive strength of the metal foil honeycomb material. For example, in order to obtain close tip tolerances in such fans, it is necessary to compress the honeycomb layer, at least in some spots, to as little as 10% of its original thickness. It was found that the honeycomb material could not be compressed to this extent, except by a time-consuming process of manually hammering it into such a shape.

An object of this invention is to provide an axial flow fan having a fan ring with a honeycomb type seal thereabout, together with a method of manufacturing same, which may be reduced to only a fraction of its original thickness with a minimum of time and effort.

A further object is to provide such a fan and manufacturing method in which the seal is made up of commercially available honeycomb material which requires only a minimum of modification.

Still another object is to provide such a fan and manufacturing method in which the honeycomb material is reduced to the desired thickness by rotation of a blade within the ring, and yet without damage to the blade despite the considerable extent to which the honeycomb is reduced.

A still more particular object is to provide a shoe which is attachable to the blade for facilitating this reduction of the honeycomb.

These and other objects are accomplished, in accordance with the illustrated embodiment of the present invention, by a fan ring having a lining of metal foil honeycomb material which has been annealed. Thus, as distinguished from the "full hard" condition in which this material is offered commercially, the honeycomb is relatively soft and thus bendable along the axes of the openings therethrough when subjected to compressive forces. Consequently, with such material disposed about the inner periphery of the fan ring with the openings extending radially of the ring, it is easily crushed to only a fraction of its original thickness. Furthermore, the annealed material does not have the spring back which is evident in full hard metal foil honeycomb material, so that, once crushed, it tends to maintain the desired blade tip-to-fan ring clearance.

Preferably, the honeycomb material is annealed prior to installation within the fan ring, and the metal foil sheets of such material are joined together only to an extent necessary to permit the material to be handled. This weak joinder of the foil sheets renders the material even more readily crushable, because the sheets are free to bend relative to one another without tearing. At the same time, the weak joints between the sheets enable the layer of honeycomb material to be handled during installation in the fan ring, as above-described. When commercially available honeycomb material is used, the heat from the annealing process weakens these joints to the desired extent.

In its preferred form, the lining is made up of a back-up plate to which a layer of the honeycomb material is adhered. In this manner, the lining may be preformed for attachment to existing fan rings. Also, it may be replaced or repaired with a minimum of time and effort.

The installed lining is preferably crushed to the desired thickness by one or more rotations of a fan blade within the fan ring. For this purpose, there is a forming shoe which is removably attachable to the end of the blade so as to protect the blade tip from damage which might result from direct contact with the honeycomb material.

In the drawings, wherein like reference characters are used throughout to designate like parts:

FIG. 1 is a perspective view of an axial flow fan having a fan ring lined with honeycomb material in accordance with the present invention;

FIG. 2 is an enlarged perspective view of part of the lining and the tip end of a blade during installation of the blade;

FIG. 3 is a perspective view similar to FIG. 2, but with the shoe attached to the blade end during crushing of the lining;

FIG. 4 is a sectional view of the lining and the shoe on the blade end;

FIG. 5 is a cross sectional view of a blade within the lined fan ring; and

FIG. 6 is a perspective view of a portion of the preformed lining prior to installation in the fan ring.

With reference now to the details of the above-described drawings, and particularly FIG. 1 thereof, the axial flow fan 10 includes a fan ring 11 mounted in an opening through a rectangular housing 12, and a blade 13 carried by a coupling 14 for rotation within the fan ring. The coupling is mounted on a support 15 extending across the top of the ring and is driven by a suitable connection (not shown) with a motor 16 on one end of the support. More particularly, and in accordance with the present invention, the inner periphery of the fan ring is lined at 17 with honeycomb to provide a substantially uniform clearance about the tip of the blade 13.

As previously described, in industrial fans of this type, wherein the blade 13 may measure 6 feet or more from tip-to-tip, the ring is usually a rolled channel which, during construction, is welded and galvanized. As a result, although the nominal clearance between the tip of the blade and the inner periphery of the ring may be ¾ to 1¼ inches, the actual clearance may vary from ½ to 1½ inches upon assembly of the blade within the ring.

As also previously described, the lining 17 about the fan ring is preferably made up of a layer of commercially available, metal foil honeycomb material. As shown in detail in FIG. 6, this honeycomb material comprises sheets 18 of aluminum or other metal foil which are bent along their lengths and joined at spaced apart locations 19 so as to form parallel, side-by-side openings 20 therebetween. More particularly, the sheets are supplied in a "full hard" condition and are joined by an adhesive. Thus, the layer is rigid as a column and extremely strong in compression in a direction parallel to the axes of the openings 20. Because the sheets are joined at 19, they will tend to tear rather than bend, when subjected to compressive force. Also, the foil, in its full hard condition, has a tendency, when bent, to spring back to its original shape.

In accordance with the present invention, this commercially available honeycomb material is first annealed, which, as well known in the art, involves heating it above a certain temperature and then cooling it slowly. Although this annealing temperature will vary with different metals, all metals have a critical annealing temperature at which they become relatively soft, and thus bendable, as all of their internal pressures are removed. It is another characteristic of metals that, when annealed, they lose the above-mentioned tendency to spring back—i.e., when bent, they will tend to retain that shape.

Furthermore, annealing temperatures are generally sufficiently high that they will substantially destroy the bond between the adjacent sheets 18 of metal foil. In any case, the honeycomb material may be raised to a temperature sufficient for this purpose, even though it is above the critical annealing temperature, so long as it is not above the melting point of the metal foil. That is, the adhesive normally used for this purpose will be softened during the annealing process so that, even though it may reharden during cooling of the honeycomb, the joint between the sheets will be extremely weak. More particularly, the adherence between the sheets is not sufficient to seriously resist their bending relative to one another as the honeycomb layer is crushed in accordance with the present invention. On the other hand, the joint still provides sufficient adherence between the adjacent sheets of the honeycomb to permit the layer of honeycomb to be handled in the manner described below.

After the layer of honeycomb material has been annealed, as above-described, it is secured to a backing plate 21 of plastic material which is relatively rigid, and yet bendable to permit it to conform to the curvature of the fan ring. Actually, this does not require a great amount of bending since the fan ring may be 6 feet or more in diameter, while the lining 17 about its periphery may be in the order of 1 inch. In any case, the end edges of the sheets on one side of the layer of honeycomb material are adhered to the face of the plate 21 so as to preform the lining 17 for releasable attachment to the inner periphery of the fan ring.

In the preferred embodiment of the invention, the back-up plate 21 is formed by laying up suitable reinforcement such as fiber glass in a mold which is then filled with a liquid thermosetting resin, preferably an epoxy resin. As the resin sets up, the end edges of the layer of honeycomb material are pressed against it, so that the hardened resin will form small fillets about these edges, as shown in FIG. 6.

Preferably, the preformed lining is made up in large sheets and then cut into sections suitable for installation in the fan ring. Normally, several sections are laid end-to-end within the fan ring so as to leave a gap between opposing ends, as shown in FIG. 2. This permits installation of the blades into the coupling 14, after which an additional section of the lining is installed in the gap between the ends of the already laid up section of lining.

As best shown in FIGS. 2 and 3, each section of the lining 17 of honeycomb material is releasably attached to the inner periphery of the fan ring 11 by means of screws 22 extending through matching holes in the back-up plate 21 and fan ring 11. As previously described, this or other suitable means of fastening the plate to the fan ring enables the lining to be installed in existing fan rings, and also to be replaced or repaired with a minimum of difficulty.

The shoe 23 attachable to the blade 13 for crushing the layer of honeycomb upon rotation of the blade, is shown in each of FIGS. 3 and 4 to include a V-shaped plate 24 adapted to fit over the trailing edge of the blade 13 and to be properly located longitudinally of the blade by an abutment 24 on its end engageable with the tip of the blade. When so fitted, the V-plate is held in place by means of a U-shaped strap 25 fittable over the leading edge of the blade and secured tightly thereagainst by means of nuts 26 threaded over its opposite ends and against a flange 27 welded across the outer side of the V-plate. More particularly, the opposite ends of the flange 27 are notched to receive the ends of the strap 25, so that it may be moved up over such ends, along with the V-plate, and the nuts then threaded over the ends so as to attach the V-plate securely against the trailing edge of the blade.

There is another flange 28 welded to the outer side of the V-plate 24 intermediate its ends. A support 29 in the form of a plate having turned-down opposite sides is supported from flange 28 by means of threaded bolts 30 extending through them. A pair of lock nuts 30a on the bolts 30 on opposite sides of flange 28 enable the support plate 29 to be moved longitudinally with respect to the V-plate 24 and thus longitudinally with respect to the length of the blade 13.

A pair of rollers 31 and 32 extend laterally beneath the plate 29 and have their opposite ends rotatably mounted in the turned-down sides of the plate. Thus, with the blade turned to zero pitch, as shown in FIGS. 2 and 3, as well as in broken lines in FIG. 5, the rollers extend transversely across the lining 17. The roller 32, which is farthest from the V-plate 24 and thus leads the other roller 31 upon rotation of the shoe 23 to the right in FIG. 3, is located radially inwardly of the roller 31. Thus, as shown in FIGS. 3 and 4, the roller 32 will initially crush the honeycomb material to only a portion of the extent desired, and the roller 31 then crushes it further to the thickness desired. Inasmuch as this crushing is done in stages, less force is required in rotating the shoe 23 by means of the blade 13. However, it will be understood that a single roller 31 of relatively large diameter may be found sufficient. As can also be seen, there is a flange 31a on opposite ends of the roller 31 for rolling over the opposite side edges of the lining 17 during the final crushing stage. After the honeycomb has been crushed, and the shoe 23 removed, the blade 13 may be turned to the desired pitch.

As can be seen from FIGS. 3, 4 and 5, when the honeycomb is crushed, the end edges thereof are folded down relative to one another. Thus, depending upon the extent to which the honeycomb is crushed, the folded edges of the honeycomb may almost close the ends of the openings 20.

Normally, prior to crushing, the lining 17 is of a height substantially equal to the estimated maximum clearance between the blade tip and the inner periphery of the fan ring. In this manner, it may be expected that the clearance between the blade tip and crushed inner periphery of the lining will be substantially uniform. Of course, since the final forming roller 31 extends radially beyond the blade tip, it will compensate for any larger than expected clearance between the blade tip and fan ring. Even if this clearance is larger than expected by an amount greater than the extension of the roller 31 beyond the tip of the blade, the resulting area of the lining 17 which was not crushed at all would be relatively small. Furthermore, and as above-described, the nuts 30a on the threaded end of the bolt 30 enable the support plate 29, and thus the roller 31 to be adjusted toward and away from the tip of the blade so as to crush the lining to a greater or lesser extent, as desired.

From the foregoing, it will be seen that this invention is one well adapted to attain all of the ends and objects hereinabove set forth, together with other advantages which are obvious and which are inherent to the method and article.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a method of manufacturing an axial flow fan, the steps of providing honeycomb constructed of bent sheets of metal foil bonded together at spaced locations by an adhesive, annealing the honeycomb to soften the metal foil and to substantially destroy the adhesive bond lining of a fan ring with the annealed metal foil honeycomb with the openings therethrough arranged radially of the ring, and crushing the inner periphery of the lining to provide a substantially uniform clearance about the tip of the blade.

2. In a method of the character defined in claim 1, including the step of mounting a shoe on the blade, and rotating the blade to cause the shoe to crush the lining.

References Cited

UNITED STATES PATENTS

| | | | |
|---|---|---|---|
| 2,963,307 | 12/1960 | Bobo | 277—53 |
| 3,042,365 | 7/1962 | Curtis et al. | 253—39 |
| 3,046,648 | 7/1962 | Kelly | 277—53 |
| 3,056,583 | 10/1962 | Varadi et al. | 253—78 |
| 3,068,016 | 12/1962 | Dega | 277—96 |
| 3,083,975 | 4/1963 | Kelly | 277—53 |
| 3,126,149 | 3/1964 | Bowers et al. | 230—133 |
| 3,227,599 | 1/1966 | Holland | 161—68 |
| 3,281,307 | 10/1966 | Moeller et al. | 161—68 |
| 3,346,175 | 10/1967 | Wiles | 230—120 |

FOREIGN PATENTS 793,886  4/1958  Great Britain.

JOHN F. CAMPBELL, Primary Examiner

D. C. REILEY, Assistant Examiner

U.S. Cl. X.R.

29—455; 156—221; 230—133; 253—77; 277—96

PO-1050
(5/69)

UNITED STATES PATENT OFFICE
CERTIFICATE OF CORRECTION

Patent No. 3,487,519　　　　　　　　　Dated January 6, 1970

Inventor(s) Eugene M. Davidson

It is certified that error appears in the above-identified patent and that said Letters Patent are hereby corrected as shown below:

Column 6, line 6, after "bond" insert a comma; line 7, cancel "of".

SIGNED AND
SEALED
MAY 12 1970

(SEAL)
Attest:

Edward M. Fletcher, Jr.
Attesting Officer

WILLIAM E. SCHUYLER, JR.
Commissioner of Patents